(12) United States Patent
Arnold et al.

(10) Patent No.: US 6,392,009 B1
(45) Date of Patent: May 21, 2002

(54) EXTENDED-ROD BENZOBISAZOLE POLYMERS

(75) Inventors: Fred E. Arnold; Thuy D. Dang, both of Centerville; Narayanan Venkatasubramanian, Bellbrook, all of OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 09/776,063

(22) Filed: Feb. 13, 2001

(51) Int. Cl.[7] .......................... C08G 73/06; C08G 73/22
(52) U.S. Cl. ...................... 528/423; 528/397; 528/332; 528/337; 528/344; 528/345; 528/346; 528/347; 528/348; 528/373; 528/487
(58) Field of Search ................................ 528/423, 397, 528/332, 337, 344, 345, 346, 347, 348, 373, 487

(56) References Cited

U.S. PATENT DOCUMENTS

| | | | | |
|---|---|---|---|---|
| 5,312,876 A | * | 5/1994 | Dang et al. | 525/435 |
| 5,312,895 A | * | 5/1994 | Dang et al. | 528/337 |
| 5,344,896 A | * | 9/1994 | Dang et al. | 525/435 |
| 5,508,376 A | * | 4/1996 | Dang et al. | 528/328 |
| 5,521,277 A | * | 5/1996 | Tan et al. | 528/337 |
| 5,534,613 A | * | 7/1996 | Tan et al. | 528/176 |

OTHER PUBLICATIONS

T.D. Dang, N. Venkatasubramanian, F.E. Arnold, Aromatic Benzobisazole Polymers Based on 1H–Pyrazole, Polymer Preprints, vol. 41, No. 1, Mar. 2000, Published Feb. 22, 2000, pp217–218.

* cited by examiner

*Primary Examiner*—Duc Truong
(74) *Attorney, Agent, or Firm*—Charles E. Bricker; Thomas L. Kundert

(57) ABSTRACT

Benzobisazole polymers having repeating units of the formula

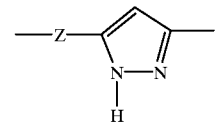

wherein Z is

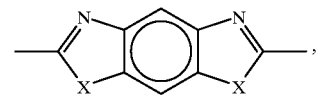

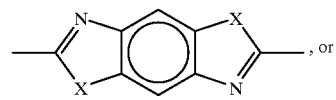

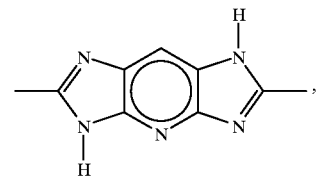

wherein X is —S—, —O— or —NH—.

5 Claims, No Drawings

EXTENDED-ROD BENZOBISAZOLE POLYMERS

RIGHTS OF THE GOVERNMENT

The invention described herein may be manufactured and used by or for the Government of the United States for all governmental purposes without the payment of any royalty.

BACKGROUND OF THE INVENTION

The present invention relates to high performance aromatic heterocyclic polymer compositions.

Rigid-rod benzobisazole polymers have excellent thermal and oxidative stability and solvent resistance. They exhibit superior tensile strength and modulus when fabricated from the liquid crystalline state into film and fiber. Although their mechanical properties (tensile strength and modulus) are far superior to the state-of-the-art, they lack the required compressive strength to be utilized in organic structural composites. We have prepared new benzobisazole polymer compositions based on extended-rod conformations that provide a mechanism for improved compressive properties.

SUMMARY OF THE INVENTION

In accordance with the present invention there are provided benzobisazole polymers having repeating units of the formula

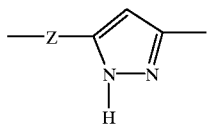

wherein Z is

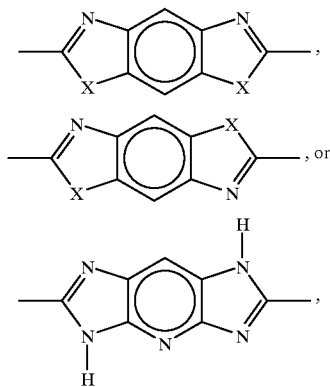

wherein X is —S—, —O— or —NH—.

DETAILED DESCRIPTION OF THE INVENTION

The polymers of this invention are prepared by the polycondensation reaction of 2,5-diamino-1,4-benzenedithiol dihydrochloride, 4,6-diamino-1,3-benzenediol dihydrochloride, 1,2,4,5-tetraaminobenzene tetrahydrochloride, or 2,3,5,6-tetraaminopyridine trihydrochloride with 1H-pyrazole-3,5-dicarboxcylic acid or its diacidchloride in polyphosporic acid. The polymerization is carried out at monomer concentrations of 10–14 wt % and reaction temperatures up to 180° C. The polymers are isolated by precipitation in water followed by soxhlet extraction with water until they are acid free. Procedures for polymerization and recovery of these polymers are well known in the art.

The following examples illustrate the invention:

EXAMPLE 1

Synthesis of 1H-pyrazole-3,5-dicarbonyl Dichloride 10.0 g of 3,5-pyrazoledicarboxylic acid monohydrate was heated to reflux with 1 liter of thionyl chloride for about three hours under nitrogen, when a nearly homogeneous solution was obtained. After hot filtration and removal of thionyl chloride, an off-white solid, with an m.p. of 89–91° C. was obtained. The solid was recrystallized from hot heptane after charcoal treatment to obtain white, glistening crystals, m.p. 93–94° C., yield 45%, based on the first crop of crystals. IR spectrum: (1765 cm$^{-1}$, carbonyl); mass spectrum: (m/e 192, 194, 196 for M, M+2 and M+4 ions); microanalytical results: (calculated, C, 31.13, H, 1.04, N, 14.52, Cl, 36.75), (found, C, 31.17, H, 0.92, N, 14.48, Cl, 36.81).

EXAMPLE 2

Synthesis of Polymer I

Into the bottom of a resin flask equipped with a high torque mechanical stirrer, a nitrogen inlet/outlet adapter, and a side opening for additions, were placed 3.4822 g (20 mmole) of 3,5-pyrazole dicarboxylic acid monohydrate, 4.9040 g (20 mmole) of 2,5-diamino-1,4-benzenedithiol dihydrochloride, and 19.96 g of 77% polyphosphoric acid (PPA). The monomers were incorporated into PPA by stirring at room temperature for 2 hours. The resultant mixture was dehydrochlorinated under $N_2$ flow and heated slowly to 95° C. in an oil bath, and maintained at that temperature for 24 hours. The reaction mixture was cooled to 50° C. and 15.83 g of phosphorus pentoxide was added to the mixture, thus bringing the final polymer concentration to 12%. The mixture was heated under a dry nitrogen flow at 60° C. for 2 hr, 100° C. for 4 hr, and finally at 180° C. for 24 hr. At the end of the polymerization, the viscous polymer dope was precipitated into water. The resultant fibrous polymer was chopped in a Waring blender, collected by suction filtration, washed with ammonium hydroxide, then soxhlet extracted with water for 24 hours, and finally dried under reduced pressure (0.002 torr) at 100° C. for 24 hours. The polymer yield was 5.12 g, an intrinsic viscosity of 7.9 dl/g was measured in methanesulfonic acid at 300° C.

EXAMPLE 3

Synthesis of Polymer II

Into the bottom of a resin flask equipped with a high torque mechanical stirrer, a nitrogen inlet/outlet adapter, and a side opening for additions, were placed 3.4822 g (20 mmole) of 3,5-pyrazole dicarboxylic acid monohydrate, 4.2612 g (20 mmole) of 4,6-diaminoresorcinol dihydrochloride, and 23.55 g of 77% polyphosphoric acid (PPA). The monomers were incorporated into PPA by stirring at room temperature for 2 hr. The resultant mixture was dehydrochlorinated under $N_2$ flow and heated slowly to 100° C. in an oil bath, and maintained at that temperature for 24 hours. The reaction mixture was cooled to 50° C. and 15.35 g of phosphorus pentoxide was added to the mixture, thus bringing the final polymer concentration to 10%. The mixture was heated under a dry nitrogen flow at 60° C. for 2 hr, 100° C. for 4 hr, and finally at 180° C. for 24 hr. At the end of the polymerization, the viscous polymer dope was precipitated into water. The resultant fibrous polymer was chopped in a Waring blender, collected by suction filtration, washed with ammonium hydroxide, then soxhlet extracted with water for 24 hr, and finally dried under reduced pressure (0.002 torr) at 100° C. for 24 hr. The polymer yield was 4.40 g, and intrinsic viscosity of 3.9 dl/g was measured in methanesulfonic acid at 30° C.

EXAMPLE 4

Synthesis of Polymer III

Into the bottom of a resin flask equipped with a high torque mechanical stirrer, a nitrogen inlet/outlet adapter, and a side opening for additions, were placed 3.8591 g (20 mmole) of 3,5-pyrazole dicarboxylic acid chloride, 4.2612 g (20 mmole) of 4,6-diaminoresorcinol dihydrochloride, and 17.21 g of 77% polyphosphoric acid (PPA). The monomers were incorporated into PPA by stirring at room temperature for 2 hr. The resultant mixture was dehydrochlorinated under $N_2$ flow and heated slowly to 100° C. in an oil bath, and maintained at that temperature for 24 hours. The reaction mixture was cooled to 50° C. and 9.59 g of phosphorus pentoxide was added to the mixture, thus bringing the final polymer concentration to 14%. The mixture was heated under a dry nitrogen flow at 600° C. for 2 hr, 100° C. for 4 hr, and finally at 180° C. for 24 hr. At the end of the polymerization, the viscous polymer dope was precipitated into water. The resultant fibrous polymer was chopped in a Waring blender, collected by suction filtration, washed with ammonium hydroxide, then soxhlet extracted with water for 24 hr, and finally dried under reduced pressure (0.002 torr) at 100° C. for 24 hr. The polymer yield was 4.30 g, an intrinsic viscosity of 4.1 dl/g was measured in methanesulfonic acid at 300° C.

EXAMPLE 5

Synthesis of Polymer IV

Into the bottom of a resin flask equipped with a high torque mechanical stirrer, a nitrogen inlet/outlet adapter, and a side opening for additions, were placed 1.7411 g (10 mmole) of 3,5-pyrazole dicarboxylic acid monohydrate, 2.8402 g (10 mmole) of 1,2,4,5-tetraaminobenzene tetrahydrochloride, and 10.87 g of 77% polyphosphoric acid (PPA). The monomers were incorporated into PPA by stirring at room temperature for 2 hr. The resultant mixture was dehydrochlorinated under $N_2$ flow and heated slowly to 100° C. in an oil bath, and maintained at that temperature for 24 hours. The reaction mixture was cooled to 50° C. and 8.23 g of phosphorus pentoxide was added to the mixture, thus bringing the final polymer concentration to 10%. The mixture was heated under a dry nitrogen flow at 60° C. for 2 hr, 100° C. for 4 hr, and finally at 180° C. for 24 hr. At the end of the polymerization, the viscous polymer dope was precipitated into water. The resultant fibrous polymer was chopped in a Waring blender, collected by suction filtration, washed with ammonium hydroxide, then soxhlet extracted with water for 24 hr, and finally dried under reduced pressure (0.002 torr) at 100° C. for 24 hr. The polymer yield was 2.19 g, an intrinsic viscosity of 1.8 dug was measured in methanesulfonic acid at 30° C.

EXAMPLE 6

Synthesis of Polymer V

Into the bottom of a resin flask equipped with a high torque mechanical stirrer, a nitrogen inlet/outlet adapter, and a side opening for additions, were placed 1.9299 g (10 mmole) of 3,5-pyrazole dicarboxylic acid chloride, 2.8402 g (10 mmole) of 1,2,4,5-tetraaminobenzene tetrahydrochloride, and 11.17 g of 77% polyphosphoric acid (PPA). The monomers were incorporated into PPA by stirring at room temperature for 2 hr. The resultant mixture was dehydrochlorinated under $N_2$ flow and heated slowly to 100° C. in an oil bath, and maintained at that temperature for 24 hours. The reaction mixture was cooled to 50° C. and 8.46 g of phosphorus pentoxide was added to the mixture, thus bringing the final polymer concentration to 10%. The mixture was heated under a dry nitrogen flow at 60° C. for 2 hr, 100° C. for 4 hr, and finally at 180° C. for 24 hr. At the end of the polymerization, the viscous polymer dope was precipitated into water. The resultant fibrous polymer was chopped in a Waring blender, collected by suction filtration, washed with ammonium hydroxide, then soxhlet extracted with water for 24 hr, and finally dried under reduced pressure (0.002 torr) at 100° C. for 24 hr. The polymer yield was 2.20 g, an intrinsic viscosity of 3.1 dl/g was measured in methanesulfonic acid at 30° C.

EXAMPLE 7

Synthesis of Polymer VI

Into the bottom of a resin flask equipped with a high torque mechanical stirrer, a nitrogen inlet/outlet adapter, and a side opening for additions, were placed 1.9299 g (10 mmole) of 3,5-pyrazole dicarboxylic acid chloride, 2.6656 g (10 mmole) of 2,3,5,6-tetraaminopyridine trihydrochloride monohydrate, and 12.50 g of 77% polyphosphoric acid (PPA). The monomers were incorporated into PPA by stirring at room temperature for 2 hr. The resultant mixture was dehydrochlorinated under $N_2$ flow and heated slowly to 100° C. in an oil bath, and maintained at that temperature for 24 hours. The reaction mixture was cooled to 50° C. and 7.05 g of phosphorus pentoxide was added to the mixture, thus bringing the final polymer concentration to 10%. The mixture was heated under a dry nitrogen flow at 60° C. for 2 hr, 100° C. for 4 hr, and finally at 180° C. for 24 hr. At the end of the polymerization, the viscous polymer dope was precipitated into water. The resultant fibrous polymer was chopped in a Waring blender, collected by suction filtration, washed with ammonium hydroxide, then soxhlet extracted with water for 24 hr, and finally dried under reduced pressure (0.002 torr) at 100° C. for 24 hr. The polymer yield was 2.21 g, an intrinsic viscosity of 2.6 dl/g was measured in methanesulfonic acid at 30° C.

Having thus described exemplary embodiments of the present invention, it should be noted by those skilled in the art that the disclosures herein are exemplary only and that alternatives, adaptations and modifications may be made within the scope of the present invention.

We claim:

1. A polymer system having repeating units of the formula

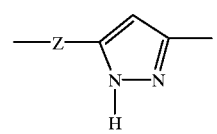

wherein Z is
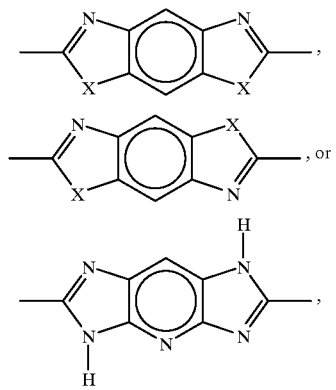
wherein X is —S—, —O— or —NH—.
2. The polymer system of claim 1 wherein Z is
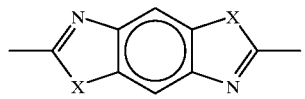
and X is —S—.
3. The polymer system of claim 1 wherein Z is
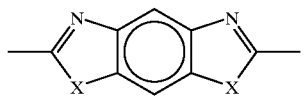
and X is —O—.
4. The polymer system of claim 1 wherein Z is
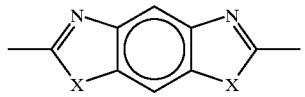
and X is —NH—.
5. The polymer system of claim 1 wherein Z is
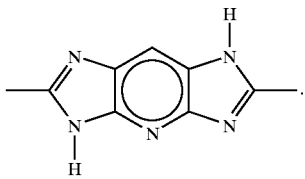
* * * * *

UNITED STATES PATENT AND TRADEMARK OFFICE
CERTIFICATE OF CORRECTION

PATENT NO.   : 6,392,009 B1
DATED        : May 21, 2002
INVENTOR(S)  : Fred E. Arnold et al.

It is certified that error appears in the above-identified patent and that said Letters Patent is hereby corrected as shown below:

Column 3,
Line 26, "600°C" should read -- 60°C --.
Line 35, "300°C" should read -- 30°C --.
Line 60, "dug" should read -- dl/g --.

Signed and Sealed this

Twenty-fourth Day of September, 2002

Attest:

Attesting Officer

JAMES E. ROGAN
Director of the United States Patent and Trademark Office